FIG. 1. INTERMEDIATE ANNEAL AT 1500°F.
HOT-ROLLED STARTING MATERIAL .062 IN. IN THICKNESS

FIG. 2. INTERMEDIATE ANNEAL AT 1700°F.
HOT-ROLLED STARTING MATERIAL .062 IN. IN THICKNESS

INVENTOR
JOHN M. JACKSON.
BY Allen & Allen
ATTORNEYS.

FIG. 3. INTERMEDIATE ANNEAL AT 1900°F.
HOT-ROLLED STARTING MATERIAL .062 in. IN THICKNESS

FIG. 4. INTERMEDIATE ANNEAL AT 2050°F
HOT-ROLLED STARTING MATERIAL .062 in. IN THICKNESS

INVENTOR.
John M. Jackson.
BY Allen & Allen
ATTORNEYS.

FIG. 5. INTERMEDIATE ANNEAL AT 1500°F.
HOT-ROLLED STARTING MATERIAL .074 IN. IN THICKNESS.

FIG. 6. INTERMEDIATE ANNEAL AT 1700°F.
HOT ROLLED STARTING MATERIAL .074 IN. IN THICKNESS

INVENTOR.
John M. Jackson.
BY Allen & Allen
ATTORNEYS.

FIG. 7. INTERMEDIATE ANNEAL AT 1900°F.
HOT ROLLED STARTING MATERIAL .074 IN. IN THICKNESS

FIG. 8. INTERMEDIATE ANNEAL AT 2050°F.
HOT-ROLLED STARTING MATERIAL .074 IN. IN THICKNESS.

INVENTOR.
John M. Jackson.
BY Allen & Allen
ATTORNEYS.

FIG. 9. INTERMEDIATE ANNEAL AT 1500°F. HOT-ROLLED STARTING MATERIAL .097 IN IN THICKNESS.

FIG. 10. INTERMEDIATE ANNEAL AT 1700°F HOT-ROLLED STARTING MATERIAL .097 IN IN THICKNESS.

FIG. 11. HOT-ROLLED STARTING MATERIAL .097 IN. IN THICKNESS.
INTERMEDIATE ANNEAL AT 1900°F.

FIG. 12. HOT-ROLLED STARTING MATERIAL .097 IN. IN THICKNESS.
INTERMEDIATE ANNEAL AT 2050°F.

INVENTOR.
JOHN M. JACKSON.
BY Allen & Allen
ATTORNEYS.

Dec. 26, 1950     J. M. JACKSON     2,535,420
PROCESS OF PRODUCING SILICON STEEL
OF HIGH-DIRECTIONAL PERMEABILITY
Filed Sept. 10, 1947     7 Sheets-Sheet 7

INVENTOR.
JOHN M. JACKSON.
BY Allen & Allen
ATTORNEYS.

UNITED STATES PATENT OFFICE 2,535,420

PROCESS OF PRODUCING SILICON STEEL OF HIGH-DIRECTIONAL PERMEABILITY

John M. Jackson, Middletown, Ohio, assignor to Armco Steel Corporation, a corporation of Ohio Application September 10, 1947, Serial No. 773,162

5 Claims. (Cl. 148—12.5)

This is a continuation in part of my application of the same title, Serial No. 478,825, filed March 11, 1943, now abandoned.

The fundamental object of my invention is the production of silicon steel, sheet or strip, of high magnetic permeabilities at high induction, and of high permeability silicon steel, sheet or strip, by processes having under certain circumstances economic advantage over those hitherto proposed. By high permeability silicon steel I refer to the recently developed types of silicon steel which have extraordinarily high premeabilities in the rolling direction, but lesser permeabilities in other directions, and are therefore "highly directional."

This fundamental object, and others which will be set forth hereinafter or will be apparent to one skilled in the art upon reading these specifications, I accomplish with that material and by means of those procedures of which I shall now set forth certain exemplary embodiments. Reference is made to the accompanying drawings in which the ordinate distances are plotted proportional to the logarithms of reduction ratios—a reduction ratio being the ratio between the initial and final thicknesses of a work piece before and after rolling.

$$\text{Reduction ratio} = \frac{100}{100 - \text{percentage reduction}}$$

The percentage reduction values are, however, noted on the ordinates.

It has been understood that in a single silicon steel crystal the maximum magnetic permeability lies in the so-called [100] direction, according to Miller's Indices. It follows from this that the permeability of silicon steels in the rolling direction of the strip or sheet will be materially increased if the [100] direction of the crystals can be oriented parallel to the direction of rolling, and, assuming this can be done, the permeability will depend upon the proportion of crystals which can be so oriented, and the perfection of their orientation, reaching a theoretical maximum at that point at which all crystals are perfectly oriented.

A more detailed description of the preferred orientation obtained by the practice of my process is one in which the crystals tend to have [100] directions parallel to the direction of rolling and (110) planes parallel to the surfaces of the sheet. This orientation can be visualized as a cube standing on one edge, in the plane of the sheet with that edge parallel to the rolling direction. The term edge refers to the meeting line of the adjacent cube faces. I shall hereinafter refer to this desired crystal orientation as "cube-on-edge" orientation, as a matter of convenient terminology.

This orientation is something which can be detected and determined by means of X-ray diffraction or by light reflection techniques, and the process hereinafter set forth is productive of this crystal orientation.

The ways hitherto developed in the art for producing this orientation in silicon steels have for the most part contemplated a plurality of stages of cold work involving heavy reductions, an intermediate anneal or anneals between successive cold reduction stages, and a final box anneal. By way of example, reference is made to Patent No. 2,158,065 issued May 16, 1939, in the names of Cole and Davidson. In this patent, which is representative of current commercial practice, the first drastic cold-rolling is a cold-reduction of about 70 per cent (60 to 85 per cent). The second cold-reduction varies from 40 to 65 per cent. Former teachings have indicated that the amounts of cold-rolling reduction should not be greater than the higher value given for each stage. It has been found that in these current methods of producing highly directional, high permeability silicon steel, too much cold-rolling was definitely a disadvantage and tended to impair the perfection of the final result.

It is believed that too heavy a cold-rolling reduction (greater than 65 per cent in the second stage for example in the process just described) tends to set up conditions resulting in a different type of recrystallization orientation upon annealing, in which the best magnetic directions of the crystals are less perfectly aligned, and which result in inferior permeability.

There has hitherto been suggested another process involving certain limitations of annealing temperatures and the like for producing a degree of cube-on-edge orientation as a result of a single drastic cold rolling followed by a heat treatment. The amount of cold rolling performed was approximately that hereinabove discussed, and the same limitation was noted, namely that the desired results became less pronounced if the cold rolling was heavier than say about 75%.

While it would normally be thought that a process of securing a cube-on-edge orientation in silicon steel which involved a single drastic cold rolling instead of two or more, would be cheaper in operation, there was found a limiting disadvantage in that, while a degree of cube-on-edge orientation could be produced in this manner, the perfection of orientation never quite reached that producible with two drastic cold rolling treatments and an intermediate and final anneal, particularly in light gauge sheets. My process is a departure from these commercial processes of the past.

It has hitherto been noted in the art that fairly high permeabilities were sometimes obtained after a substantial cold reduction and an intermediate anneal followed by a very light cold reduction and a final anneal. The results were sporadic and were not reproducible. Moreover, the permeabilities sporadically obtained were not as high as those obtainable with certainty in the commercial processes.

I have, however, found that it is possible to secure, with a procedure involving a single stage of drastic cold reduction and a subsequent very light cold reduction, permeabilities fully as high as and in instances higher than the permeabilities obtained with the best of the prior commercial practices, and to secure these results with certainty, in ways hereinafter set forth in detail.

My invention is applicable to silicon steels containing from 2% to 4.5% of silicon and beyond. At around 2% of silicon and higher, no alpha-gamma phase transformation is encountered in annealing treatments, i. e. this is the point at which the allotropic transformation disappears.

The exact point varies somewhat with the impurities in the steel, particularly with carbon. For very low carbon contents, the point is near 2% and is as high as 3% for some commercial materials, such as those containing .07% carbon.

Below a silicon content of substantially 2% my investigations appear to show that a different type of action takes place, and an action which I do not believe to be the one produced by my process on silicon steels above the point at which the allotropic transformation first appears. I have mentioned 4.5% silicon for the reason that at around this percentage in present day technique, silicon steel becomes very difficult to cold work. The fact that modern techniques are consistently raising the maximum silicon contents of silicons which may be cold worked economically, indicates than 4.5% of silicon is not the upper limit of the utility of my process, and my investigations have indicated that my process is effective on silicon steels containing more than 4.5% silicon.

By silicon steels I mean materials containing, as indicated, from substantially 2% to 4.5% or above of silicon, either with or without other important alloying ingredients, such as manganese, the balance being substantially all iron. My investigations have indicated that the presence or absence of other alloying ingredients, minor in amount with respect to silicon does not affect the process hereinafter set forth. As exemplary of a particular silicon steel to which my process is applicable, I may give a material containing 3.2% silicon, .12% manganese and .028% carbon, the balance being iron except for normal impurities. This example is not intended as limitative because, as already pointed out, my invention is applicable to a wide variety of silicon contents, and other alloying ingredients do not affect it.

My process has an initial stage of drastic cold reduction by which the hot rolled material is carried down substantially to final gauge, the second stage cold reduction, which follows an intermediate anneal, being always slight in amount, affecting thickness only by a fraction of a per cent to say about 2%. Consequently my process is applicable to the production of finished gauge materials (say from .005 to .014 inch in thickness) from hot rolled materials in a single drastic cold reduction. Hot rolled materials are available with today's equipment in gauges of from substantially .05 to substantially .14 inch, and these are generally suitable for my purpose.

Broadly, in practicing my process, I hot roll silicon steel of the required silicon content to an intermediate thickness of say .14 to .05 or preferably .1 to .06 inch. It is advantageous at this point to open anneal or box anneal the material. Also, since modern methods of producing silicon steel ingots are not productive of low carbon values, I may, if desired, employ a box anneal at this stage as a decarburizing treatment also, in accordance with the teachings of United States Patent No. 2,236,519, issued April 1, 1941, in the name of Carpenter.

The annealed material is then pickled, and is cold reduced substantially to the final thickness of say .005 to .014 inch. This stage of cold reduction is done in a plurality of passes and without any intermediate heat treatments.

It will be observed from this that the amount of cold reduction is large and in many instances greater than those hitherto believed to be the maximum for orientation, beyond which the orientation began to be impaired by the cold reduction itself. Ordinarily the cold reductions I employ lie between substantially 75% and 91%, which latter value is near the limit of reductions obtainable with modern equipment.

Then the cold rolled material is given an "open" strand or continuous anneal. By this I mean an annealing treatment in which the material in single strand form is sent through a furnace, usually of long or continuous type, in such a way that its surfaces are open to the atmosphere of the furnace, which may, however, be a controlled atmosphere. I do not intend at this point to be limited to an open anneal, since other types of annealing treatment, such as a box anneal, may be employed.

The temperature of the anneal should be between substantially 1500° and substantially 2100° F. The duration of the heat treatment is not important if all parts of the material are brought up to the desired temperature, hence an open or strand anneal is preferred for economy.

The next step in the process is the light cold reduction which has been mentioned. This will lie generally between .25 and 2.0%. It is critical for maximum permeability as will be shown, and bears no relationship to the "critical strain" reductions for maximum grain growth. A wholly different metallurgical mechanism appears to be involved, and my materials are not generally characterized by maximum grain growth.

Finally, the material is box annealed, also at a high temperature, preferably around 2200° F. This box anneal may be and preferably is an anneal carried on in a reducing atmosphere, such as an atmosphere of dry hydrogen. A suitable separator may be employed between the sheets during this anneal.

Whenever it is desired to produce the lowest possible core loss in conjunction with high permeability at high induction, the final carbon content of the material must be reduced to less than 0.008% by one or more of the steps of the process. Since it is difficult to accomplish a uniform carbon reduction all over large sheets of commercial size during the final high temperature hydrogen anneal, I prefer to subject the material to a strand anneal in "wet hydrogen" prior to the final box anneal.

This is the rapid decarburizing process of Carpenter et al., described in Patent No. 2,287,467, in which the material is given a strand anneal of only a few minutes duration, preferably within a temperature range of 1400 to 1600° F. in an atmosphere of hydrogen or other reducing gas containing from 2 to 35 per cent of water vapor. This treatment is effective in lowering the carbon content to .008% or lower, whether or not the intermediate gauge material has been decarburized by annealing in the presence of the hot mill scale as set forth above.

I may then coat the sheets with magnesium hydroxide and dry them so as to provide not only a separator for annealing but also to produce an insulative coating upon the surfaces of the sheets in the final box anneal hereinabove described.

The application of this treatment prior to the final box anneal does not interfere with the attainment of the permeabilities otherwise produced by the process. Other known treatments such as those productive of coatings for interlamination resistivity may be practiced after the box anneal, as well as a strain relieving anneal for eliminating the effects of cutting, winding into cores and the like, all without impairing the ultimate permeability.

I have above briefly outlined the ranges in which I work in accordance with the present process; but it does not follow that high permeabilities are attained with all steps varying haphazardly within the ranges set forth. The contrary is true.

I have found that there are four variables directly affecting the final result, as follows:

1. The hot-rolled thickness of the starting material.
2. The percentage reduction in the first stage cold rolling.
3. The temperature of the intermediate anneal.
4. The percentage reduction in the second stage cold rolling.

Reference is made to the charts which form the drawings of this application. In Figures 1 to 12 inclusive, two of the variables have been eliminated by providing separate charts for hot rolled starting thicknesses of .062, .074 and .097 inch throughout the range, and by providing separate charts for each of these thicknesses for intermediate annealing temperatures of 1500°, 1700°, 1900° and 2050° F. The percentage of cold rolling reduction in the first stage is measured along the ordinate axis, while the percentage cold rolling reduction in the second stage is measured along the abscissa axis. Permeability at 10 oersteds is measured perpendicularly to the plane of the chart and is indicated by contour lines. It will be noted that peak permeabilities are attained at different but correlated percentages of cold rolling reduction in the first and second stages and at different positions in the various charts. Moreover, the areas demarked by the contour lines indicative of permeability levels vary in extent from chart to chart.

Thus a specific procedure for obtaining the highest possible permeability will vary with all four of the factors mentioned, and, if any particular permeability is chosen as a level to be attained in practice, the permissible ranges of variation in any one factor will be affected by the variations in other factors.

In the present day production of highly oriented silicon steels, permeabilities below about 1700 are not of the most important significance as respects a new process, since permeabilities of 1700 and higher are obtainable by processes current in the art. The process of this invention can be practiced in the light of the teachings herein set forth either (a) to secure the highest possible permeabilities with a given piece of steel having in mind the available hot rolled thickness and the desired final gauge, or (b) so to treat a given piece of steel as to secure a permeability of, say, 1700 or above and to determine the permissible ranges of the various factors in such an operation. It will be immediately evident from the charts that a range of variation of percentage reduction in the first and second stages of cold work which will give a permeability of 1700 or higher with a given starting piece and a given temperature of the intermediate anneal, will not necessarily give the same permeability with another piece of different starting thickness heat treated at a different temperature.

Finally, it will be evident from the charts that as one or more factors vary in a given direction, the change in permeability may be slow or rapid. Where the contours approach each other closely, a cliff-like declivity is indicated where a slight change of one or more factors may produce a great change in permeability.

Because of the interplay of the four principal variables, it is difficult to discuss them individually. However, certain relationships have been discovered by me:

As the hot rolled thickness of the starting material varies from .06 to .10 inch, all other conditions being optimum, there is a permeability maximum at a starting thickness of about .085 inch.

As the percentage reduction in the first stage of cold work increases, all other conditions being optimum, a permeability maximum is to be found in a range of approximately 80 to 84% reduction at around 2100° F. intermediate annealing temperatures. For lower temperatures, the maximum permeability occurs at a somewhat lower percentage reduction, varying nearly linearly down to around 73% at 1500° F.

The intermediate annealing temperature affects the other factors; but if all other conditions remain at the optimum, there is a gradual increase of permeability with an increase in the temperature of the intermediate anneal from 1500° to 2100° F.

The percentage reduction in the second stage of cold work, all other conditions remaining optimum, gives best permeabilities at from about .4 to 1% throughout the general range.

The relationship between the hot rolled thickness and the percentage reduction in the first stage, other conditions being optimum, is essentially constant. That is, with hot rolled thicknesses ranging from .062 to .097" the optimum percentage of cold reductions remains between 80 and 84%, the range of permissible reductions broadening as the thickness increases.

Considering solely the relationship of hot rolled thickness to percentage reduction in the second stage of cold work, other conditions being optimum, it may be noted that higher starting thicknesses appear to require a lesser percentage of cold reduction in the second stage.

The relationship between percentage reduction in the first cold work stage and the intermediate annealing temperature, other conditions being optimum, is more complicated:

(a) If the percentage cold reduction lies between substantially 75% and 80%, then the permeability remains high in spite of the variations of temperature.

(b) If the cold reduction is below approximately 75%, then permeability decreases slightly with increasing temperature.

(c) If the cold reduction is above 80%, the permeability rises with temperature.

Under otherwise optimum conditions, as the temperature of the intermediate anneal increases, the required percentage reduction in the second stage of cold work decreases.

Again, under otherwise optimum conditions, as the percentage cold reduction in the first stage increases, the optimum percentage reduction in the second stage of cold work at first decreases and then increases. A minimum percentage reduction in the second stage of cold work appears at around 80% cold reduction in the first stage.

Figure 1:
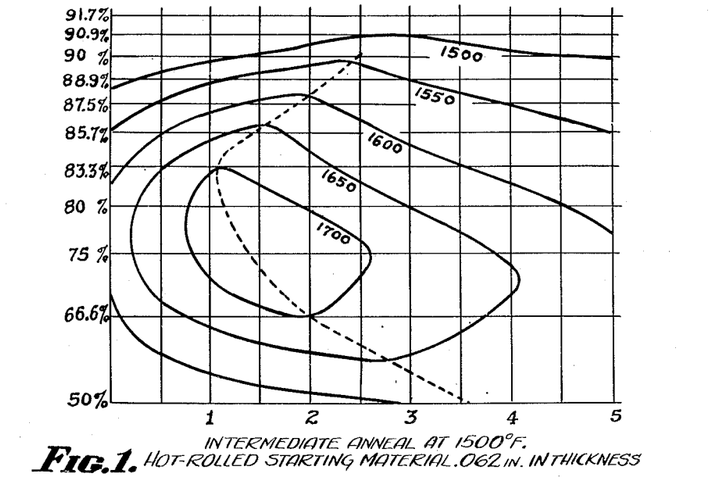
Figures 1, 2, 3 and 4 are charts pertaining to a hot-rolled starting material .062" in thickness. In these charts the percentage of cold reduction in the first stage is measured along the ordinate axis and the percentage of cold reduction in the second stage is measured along the abscissa axis. Permeability at 10 oersteds is measured in a direction perpendicular to the plane of the charts, and is therefore indicated thereon in contour lines. These charts are respectively for intermediate annealing temperatures of 1500°, 1700°, 1900° and 2050° F.
Figure 2:
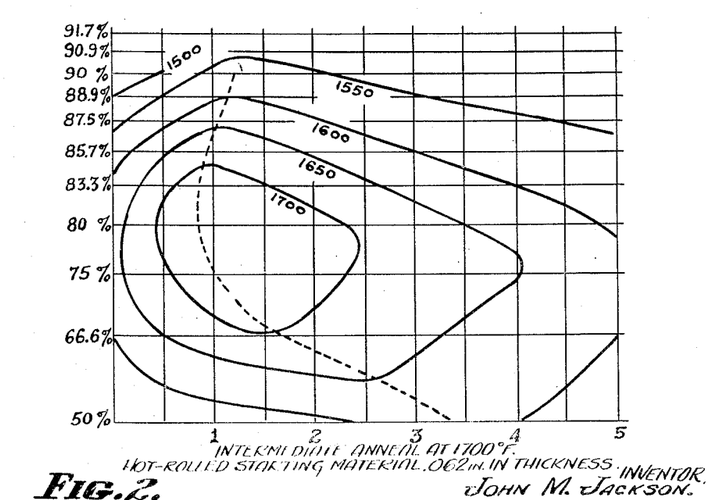
Figure 3:
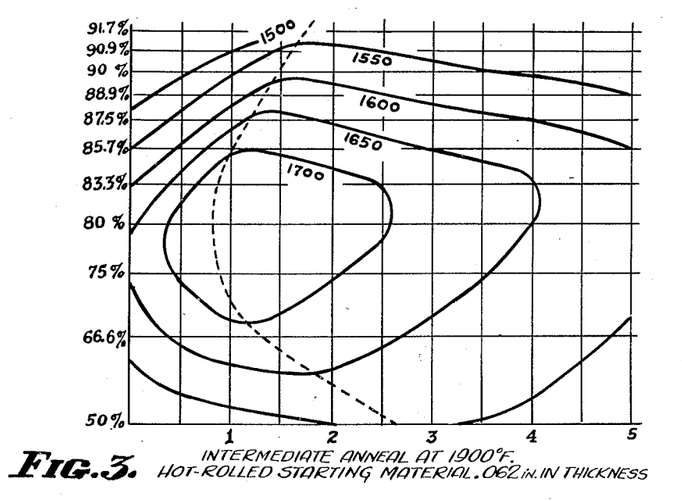
Figure 4:
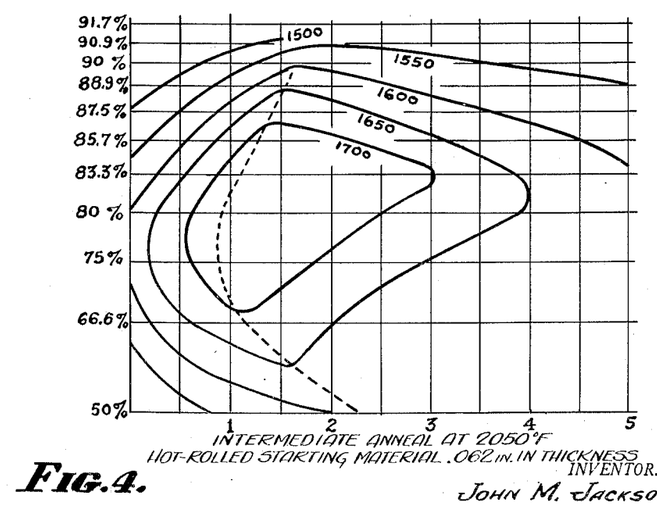
Figure 5:
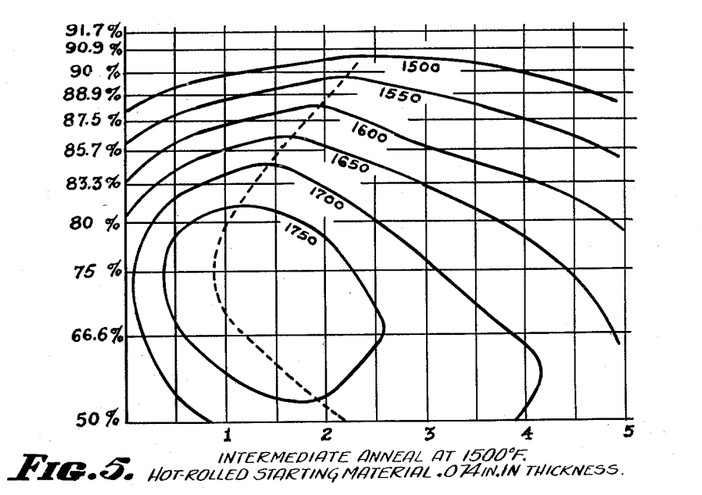
Figures 5, 6, 7 and 8 are a similar series of charts for a hot-rolled starting material .074" in thickness.
Figure 6:
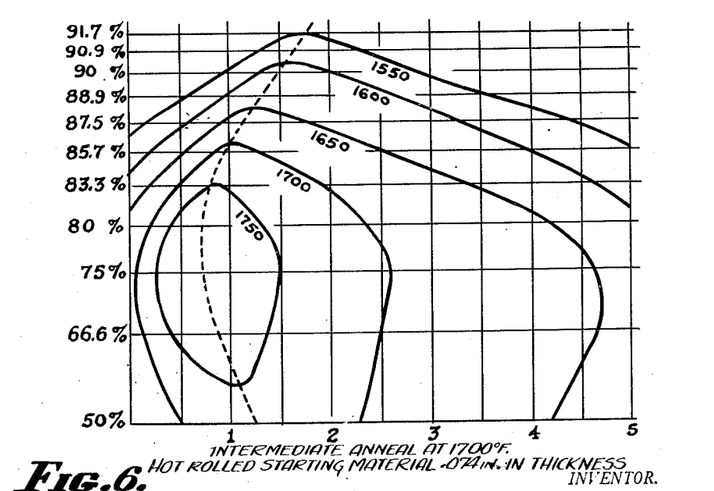
Figure 7:
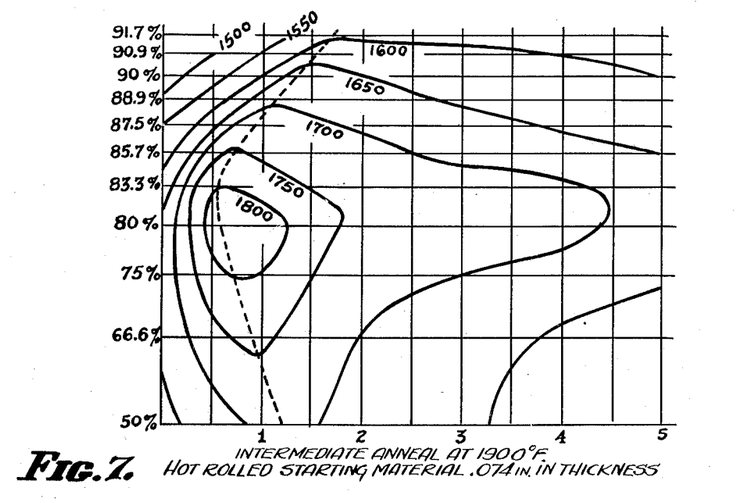
Figure 8:
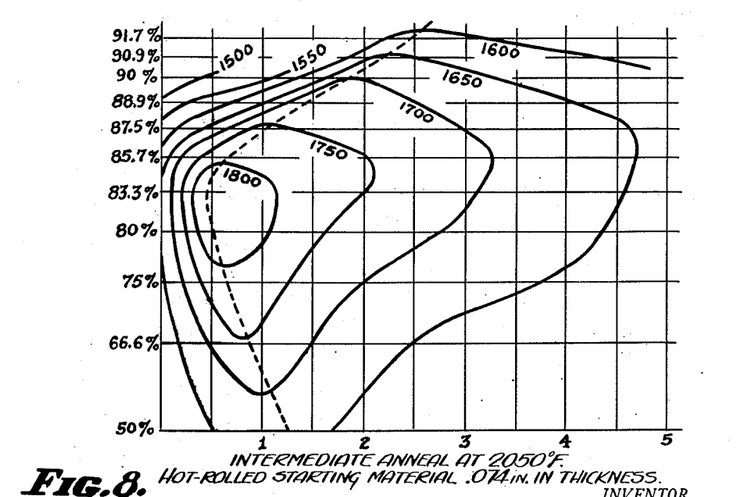
Figure 9:
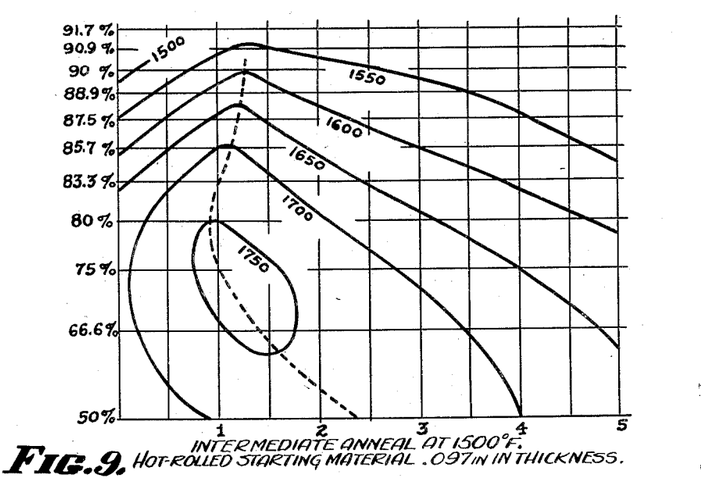
Figures 9, 10, 11 and 12 are a similar series of charts for a hot-rolled starting material .097" in thickness.
Figure 10:
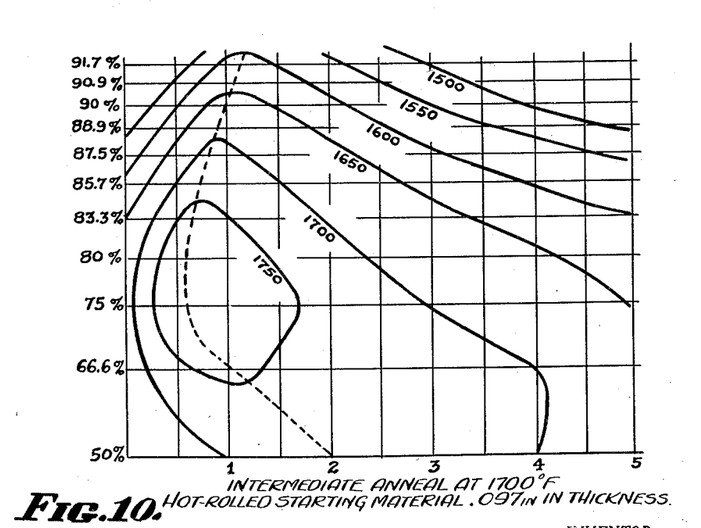
Figure 11:
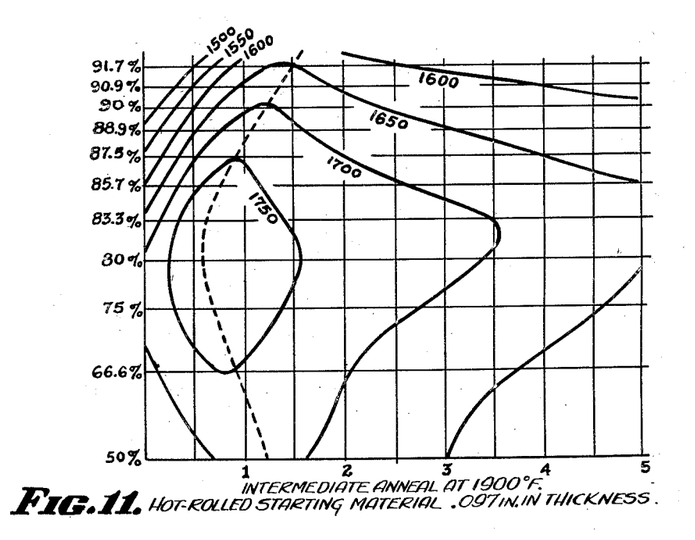
Figure 12:
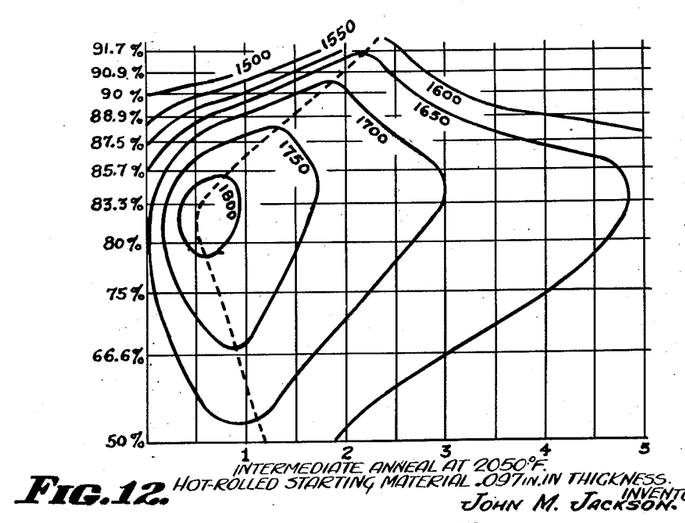
Figure 13:
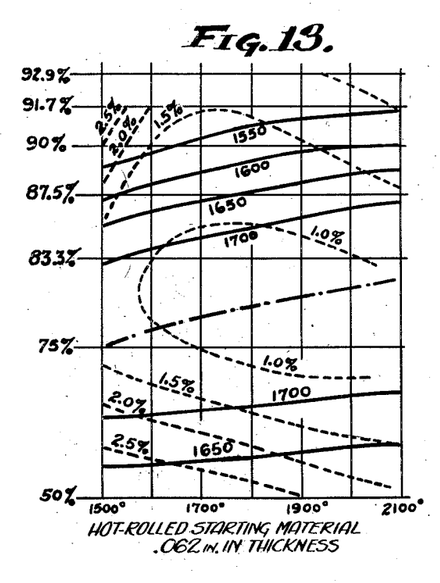
Figures 13, 14 and 15 are charts respectively for the same three gauges of hot-rolled starting material, in which charts the percentage of cold reduction in the first stage is measured along the ordinate axis, while the temperature of the intermediate anneal is measured along the abscissa axis. The solid lines on these charts represent the permeabilities obtained when the optimum percentage of cold reduction in the second stage is selected for each combination of variables represented by the charts. The dotted lines represent the numerical values of these optimum reductions. The dot-dash line indicates the maximum permeabilities obtainable within the conditions covered by the charts. These last three charts show the correlation of factors required to obtain the highest possible permeabilities.
Figure 14:
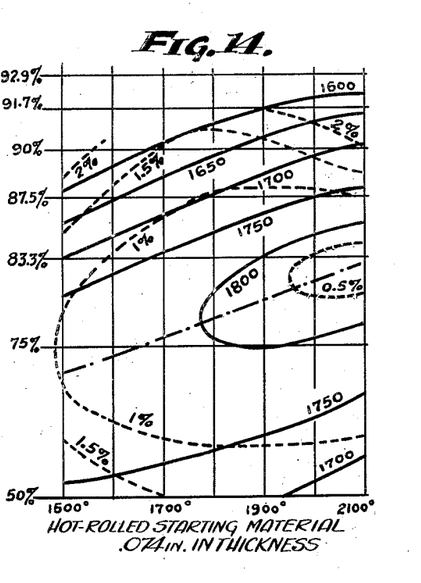
Figure 15:
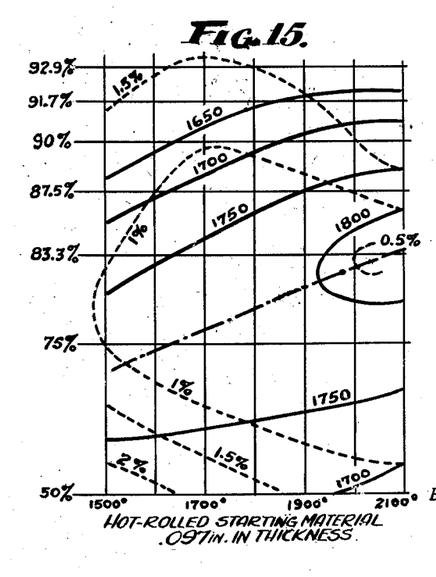

In the charts forming Figures 1 to 12, dotted lines have been used to trace the highest values of permeability obtainable with the various percentages of first stage cold reduction. These lines have been employed to construct the charts which form Figures 13 to 15 inclusive. These charts are again specific to hot rolled starting thicknesses of .062; .074 and .097 inch. Percentage reduction in the first stage of cold work is plotted on the ordinate axis and the temperature of the intermediate anneal is plotted along the abscissa axis. The solid lines form contours indicative of permeability levels, obtained when the optimum percentages of second stage reduction are selected, and the dot-dash lines indicate a ridge of highest permeability. The dotted lines are another set of contours indicative of the numerical values of the optimum reductions selected for the second stage. Figures 13 to 15, for the respective starting thicknesses, indicate the specific conditions under which peak permeabilities can be attained.

Specifically, to obtain the highest possible permeabilities in silicon steel in accordance with this process, I proceed as follows:

The final gauge of the material is, of course, set by specification. In the light of this final gauge, I select a percentage reduction for the first stage of cold work as close as possible to a range of substantially 80 to 84%, as will permit me to start with a hot rolled thickness within the limits of available materials.

Where the percentage reduction selected for the first cold reduction stage is less than about 75%, I select a temperature for the intermediate anneal which is relatively low (around 1500° F.). Next I select a percentage reduction for the final cold reduction stage between 1 and 2.5%, varying it inversely with the percentage of reduction in the first cold work stage.

Where the percentage cold reduction in the first stage is between 75 and 80%, I selected a temperature for the intermediate anneal between 1500° and 2100° F., as may be convenient, since within this range of cold reductions the temperature of the intermediate anneal has only a minor effect upon permeability. In some instances, however, I have found that temperatures at the higher end of this range give slightly higher permeabilities. I then cold reduce the material in the second stage between .5% and 1% varying inversely with the temperature of the intermediate anneal.

Where the percentage cold reduction in the first stage is greater than about 80%, I select a temperature for the intermediate anneal which will be the highest possible temperature (preferably around 2100° F.) within the limits of my equipment. I thereupon select a percentage of reduction for the second cold reduction stage between 0.5 and about 2%, varying it directly with the percentage of reduction in the first stage.

To determine procedures which will give permeabilities of 1700 or better, I proceed as before from the final gauge, selecting percentages of cold reduction in the first stage between approximately 70% and 91%, and arriving at a hot rolled thickness. Where the percentage reduction is less than about 82%, I employ any temperature between approximately 1500 and 2100° F. for the intermediate anneal, and percentages of cold reduction in the second stage which vary inversely with the temperature from .25% to 1.5%.

Where the amount of cold work in the first stage produces a reduction greater than about 82%, I vary the temperature of the intermediate anneal, between 1500° and 2100° F., directly with the amount of cold reduction in the first stage and employ a percentage reduction in the second stage between .25% and 2%, varying with the percentage of cold reduction in the first stage.

Moreover, it will be clear from the charts, Figures 13, 14 and 15, that if an area is taken substantially corresponding to the area between the 1700 permeability contour lines on Figure 13 and applied to Figures 14 and 15, areas will be established on all three charts such that operations within these areas can be depended upon to give permeabilities higher than 1700, these areas also embracing the highest permeabilities which the respective starting materials are capable of yielding in my process.

These areas can be expressed with substantial accuracy by stating that the percentage reduction in the first stage of cold rolling is not less than 70% (thus establishing a horizontal line which forms the lower boundary of the areas), and that it is not greater than the value of $y$ in the equation $$\log \frac{100}{100-y} = .000205(x-1500) + .764$$

where $x$ is the temperature of the intermediate anneal (thus establishing a slanting line as the upper boundary of the areas).

The above equation represents a standard equation for a straight slanting line on a chart, usually given as $$y = mx + b$$

the logarithmic fractional expression for the $y$ term being necessitated by the method of plotting these charts as set forth above in the description of the drawings, the number .000205, which corresponds to $m$ in the standard equation, fixing the slope of the line, the expression $(x-1500)$ being necessitated by the displacement of the $x$ axis by 1500°, and the number .764, which corresponds to $b$ in the standard formula, being the intercept of the line with the displaced $x$ axis in terms of the ordinate distance, namely log reduction ratio. The slope value, .000205 is obtainable by calculation as the slope of a slanting line substantially corresponding to the somewhat curved upper 1700 permeability contour line on Figure 13.

Modifications in my invention may be made without departing from the spirit of it. Having thus described my invention in certain exemplary embodiments, what I claim as new and desire to secure by Letters Patent is:

1. A process of producing silicon steel of high and highly directional permeability which comprises the steps of hot rolling electrical steel containing substantially 2% to 4.5% silicon to a thickness of substantially .074 inch, cold rolling the steel with a reduction in thickness of substantially 73% to 84% varying substantially directly with the temperature of the next mentioned continuous anneal, continuously annealing the steel at a temperature substantially in the range of 1500° to 2100° F., again cold rolling the steel with a reduction in thickness of substantially 1.0% to .4% varying substantially inversely with the temperature of the said continuous anneal, and subjecting the steel to a box anneal at a temperature of substantially 2200° F.

2. A process of producing silicon steel of high and highly directional permeability which comprises the steps of hot rolling electrical steel containing substantially 2% to 4.5% silicon to a thickness of substantially .097 inch, cold rolling the steel with a reduction in thickness of substantially 73% to 84%, varying substantially directly with the temperature of the next mentioned continuous anneal, continuously annealing the steel at a temperature within the range of substantially 1500° to 2100° F., again cold rolling the steel with a reduction in thickness of substantially 1.2 to .5%, varying substantially inversely with the temperature of the said continuous anneal, and subjecting the steel to a box anneal at a temperature of substantially 2200° F.

3. A process of producing silicon steel of high and highly directional permeability which comprises the steps of hot rolling electrical steel containing substantially 2% to 4.5% silicon to a thickness of substantially .05 to .14 in., cold rolling the steel with a reduction in thickness of substantially 73% to 84%, subjecting the steel to a continuous anneal at a temperature within the range, substantially, of 1500° F. to 2100° F., again cold rolling the steel with a reduction in thickness of substantially .4% to 2.0%, and subjecting the steel to a box anneal at a temperature of substantially 2200° F., in which process the reduction in the first mentioned stage of cold rolling is varied substantially directly with the temperature of the continuous anneal, and the reduction in the second mentioned cold rolling is varied substantially inversely with the temperature of the continuous anneal.

4. A process of producing silicon steel of high and highly directional permeability which comprises the steps of hot rolling electrical steel containing substantially 2% to 4.5% silicon to a thickness of substantially .05 to .14 in., cold rolling the steel, subjecting the steel to a continuous anneal at a temperature within the range, substantially, of 1500° F. to 2100° F., again cold rolling the steel with a reduction in thickness of substantially .4% to 2.0%, and subjecting the steel to a box anneal at a temperature of substantially 2200° F., in which process the percentage reduction in the first mentioned stage of cold rolling is not less than 70% and is not substantially greater than the value of $y$ in the equation $$\log \frac{100}{100-y} = .000205(x-1500) + .764$$

where $x$ is the temperature of the intermediate anneal.

5. A process of producing silicon steel of high and highly directional permeability which comprises the steps of hot rolling electrical steel containing substantially 2% to 4.5% silicon to a thickness of substantially .05 to .14 in., cold rolling the steel, subjecting the steel to a continuous anneal at a temperature within the range, substantially, of 1500° F. to 2100° F., again cold rolling the steel with a reduction in thickness of substantially .4% to 2.0%, and subjecting the steel to a box anneal at a temperature of substantially 2200° F., in which process the percentage reduction in the first mentioned stage of cold rolling is not less than 70% and is not substantially greater than the value of $y$ in the equation $$\log \frac{100}{100-y} = .000205(x-1500) + .764$$

where $x$ is the temperature of the intermediate anneal, and in which the percentage reduction in the second mentioned stage of cold rolling is varied substantially inversely with the temperature of the intermediate anneal.

JOHN M. JACKSON.

REFERENCES CITED

The following references are of record in the file of this patent:

UNITED STATES PATENTS

| Number | Name | Date |
|---|---|---|
| 2,236,519 | Carpenter | Apr. 1, 1941 |
| 2,287,466 | Carpenter | June 23, 1942 |
| 2,287,467 | Carpenter | June 23, 1942 |
| 2,303,343 | Engel | Dec. 1, 1942 |